United States Patent
Terui

(10) Patent No.: US 9,712,879 B2
(45) Date of Patent: Jul. 18, 2017

(54) INFORMATION PROCESSING APPARATUS, INFORMATION PROCESSING METHOD, AND INFORMATION PROCESSING PROGRAM

(71) Applicant: Rakuten, Inc., Tokyo (JP)

(72) Inventor: Shingo Terui, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/392,142

(22) PCT Filed: Jun. 28, 2013

(86) PCT No.: PCT/JP2013/067836
§ 371 (c)(1),
(2) Date: Dec. 23, 2015

(87) PCT Pub. No.: WO2014/207902
PCT Pub. Date: Dec. 31, 2014

(65) Prior Publication Data
US 2016/0192008 A1 Jun. 30, 2016

(51) Int. Cl.
*H04N 21/4725* (2011.01)
*G06Q 30/06* (2012.01)
(Continued)

(52) U.S. Cl.
CPC ......... *H04N 21/4725* (2013.01); *G06Q 30/06* (2013.01); *H04N 21/47815* (2013.01); *H04N 21/8133* (2013.01); *H04N 21/858* (2013.01)

(58) Field of Classification Search
CPC ............... H04N 21/4725; H04N 21/47815
See application file for complete search history.

(56) References Cited

U.S. PATENT DOCUMENTS 8,533,753 B2 * 9/2013 Briggs ................. H04N 21/435
725/32
8,813,132 B2 * 8/2014 Andrews, II ........... G06Q 30/02
725/139

(Continued)

FOREIGN PATENT DOCUMENTS

JP 2009-117974 A 5/2009
JP 2011-259184 A 12/2011

OTHER PUBLICATIONS

Amazon. Com Inc., "Amazon.com Help About the Amazon Price Check App", [online], [retrieved on Jun. 5, 2013], Internet <URL: http://www.amazon.com//gp/help/ customer/display. html?nodeId=200> 25 777320>.

(Continued)

*Primary Examiner* — Olugbenga Idowu
(74) *Attorney, Agent, or Firm* — Sughrue Mion, PLLC

(57) ABSTRACT

An information processing apparatus obtains the moving image identification information of a moving image, the time at which a specifying operation was performed, and a position specified on a display unit. When an object was specified, the information processing apparatus further obtains object information. The information processing apparatus obtains, from storage means, object information corresponding to all of the following: the obtained moving image identification information; a time being within a predetermined period of time ending at the obtained time; and a position being within a predetermined distance from the obtained position. The information processing apparatus causes information about an object indicated by the obtained object information to be presented to a user.

9 Claims, 12 Drawing Sheets

(51) Int. Cl.
*H04N 21/858* (2011.01)
*H04N 21/478* (2011.01)
*H04N 21/81* (2011.01)

(56) References Cited

U.S. PATENT DOCUMENTS

| | | | |
|---|---|---|---|
| 9,113,215 B1* | 8/2015 | Berry, III | H04N 21/4722 |
| 2009/0083815 A1* | 3/2009 | McMaster | H04N 7/17318 |
| | | | 725/110 |
| 2015/0178953 A1* | 6/2015 | Gao | G06F 17/2765 |
| | | | 345/681 |

OTHER PUBLICATIONS

International Search Report of PCT/JP2013/067836 dated Nov. 12, 2013.

* cited by examiner

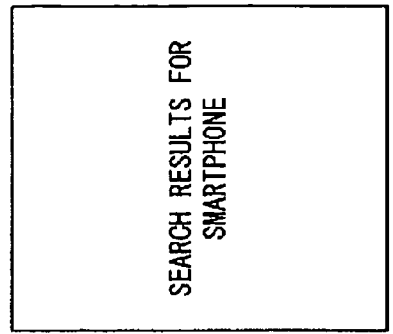
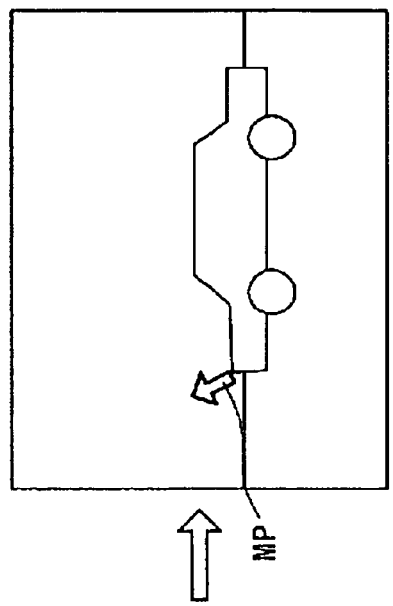
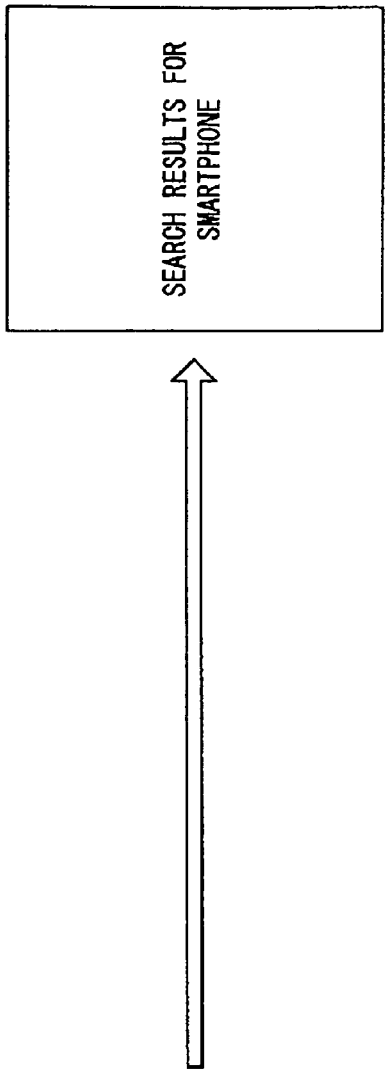
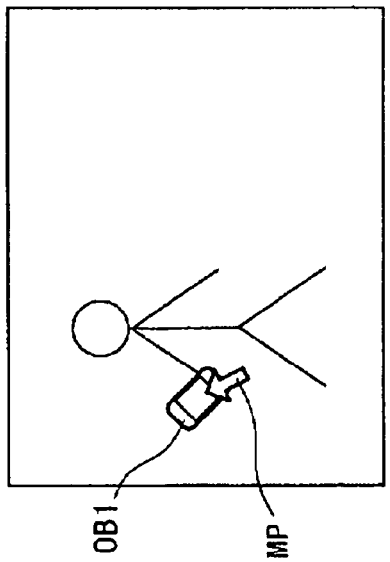
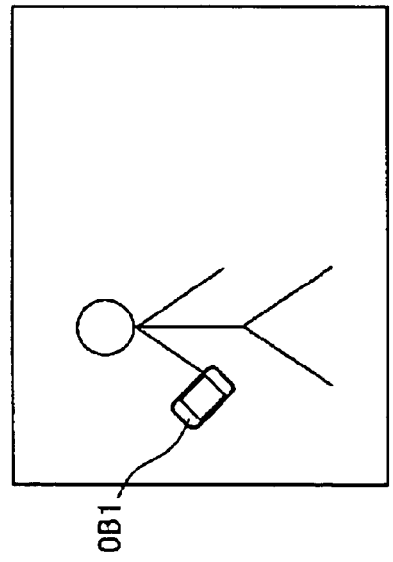

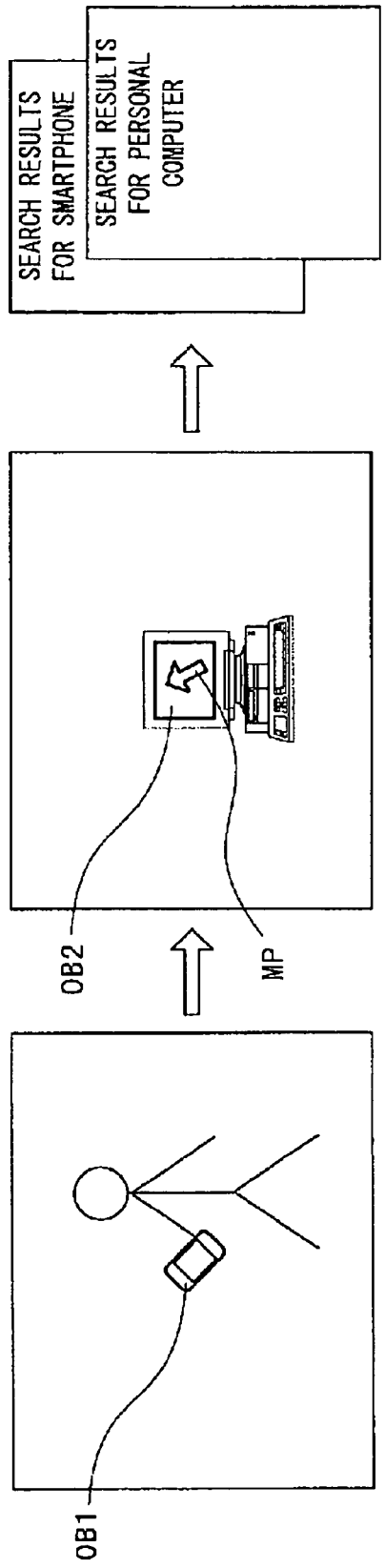

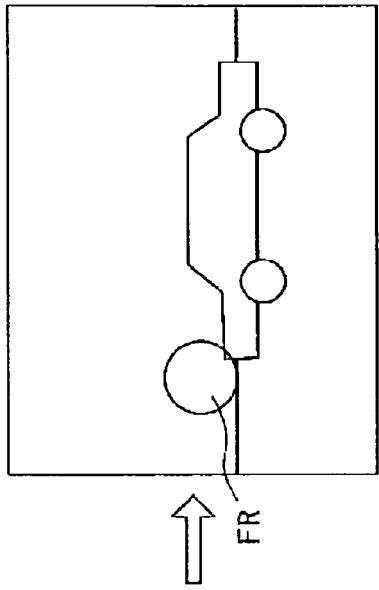
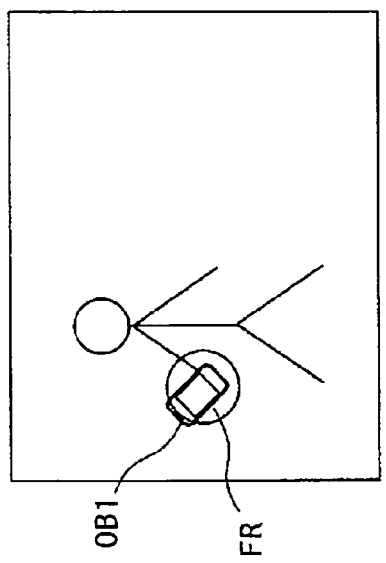
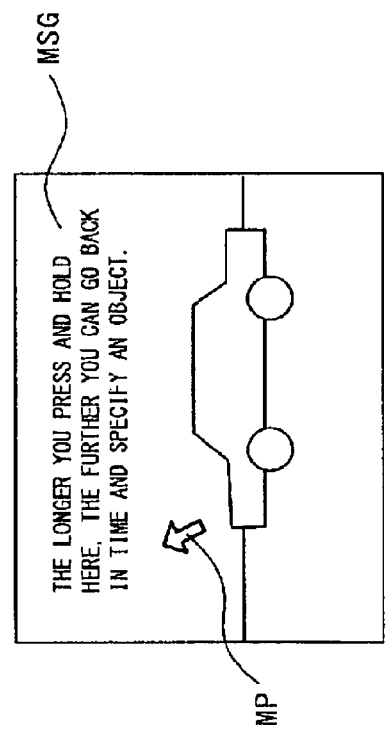

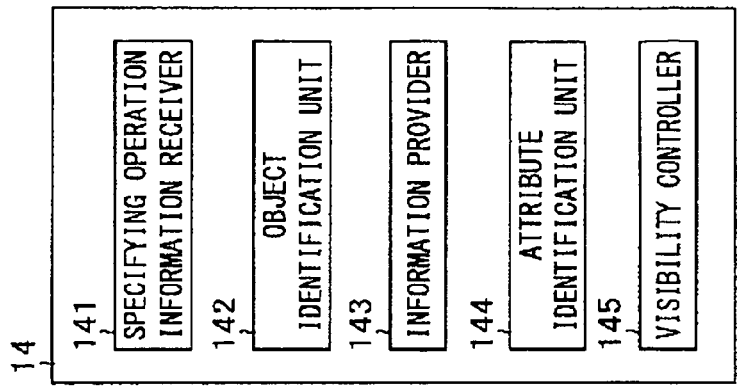
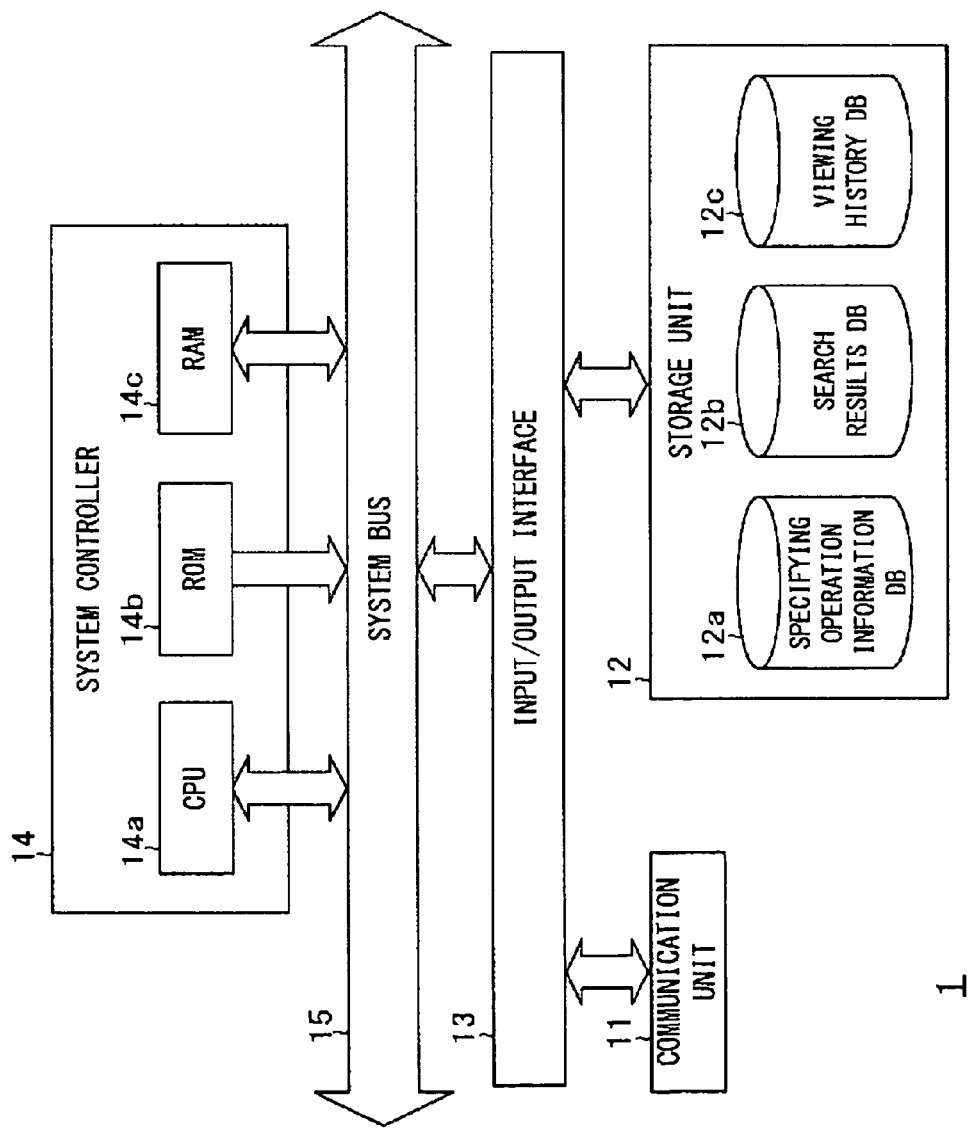

FIG.7A
SPECIFYING OPERATION INFORMATION DB  12a

| MOVING IMAGE ID |
| --- |
| USER ID |
| SPECIFYING TIME |
| SPECIFIED POSITION |
| METHOD INFORMATION |
| FIRST OBJECT INFORMATION |
| SECOND OBJECT INFORMATION |
| OBJECT-PROVIDING USER ID |
| ... |

FIG.7B
SEARCH RESULTS DB  12b

| MOVING IMAGE ID |
| --- |
| OBJECT INFORMATION |
| SEARCH RESULTS INFORMATION |
| ... |

FIG.7C
VIEWING HISTORY DB  12c

| USER ID |
| --- |
| VIEWED DATE AND TIME |
| MOVING IMAGE ID |
| OBJECT INFORMATION |
| ITEM ID |
| ... |

FIG.7D
GENRE INFORMATION DB  2a

| GENRE ID |
| --- |
| GENRE NAME |
| LEVEL |
| PARENT GENRE ID |
| CHILD GENRE ID LIST |
| ATTRIBUTE INFORMATION |

FIG.7E
ITEM INFORMATION DB  2b

| STORE ID |
| --- |
| ITEM ID |
| GENRE ID |
| ITEM NAME |
| ITEM IMAGE URL(S) |
| ITEM DESCRIPTION |
| ITEM PRICE |
| ... |

FIG.7F
OPERATION HISTORY DB  2c

| USER ID |
| --- |
| OPERATION DATE AND TIME |
| URL |

FIG.7G
MEMBER INFORMATION DB  3a

| USER ID |
| --- |
| PASSWORD |
| NICKNAME |
| NAME |
| BIRTH DATE |
| GENDER |
| ZIP CODE |
| ADDRESS |
| TELEPHONE NUMBER |
| E-MAIL ADDRESS |
| THE NUMBER OF USER'S POINTS |

FIG.10

DISPLAY ORDER LIST

| OBJECT INFORMATION | OBJECT TYPE | DISPLAY ORDER |
|---|---|---|
| OBJECT OB1 | FIRST OBJECT INFORMATION | 1 |
| OBJECT OB2 | FIRST OBJECT INFORMATION | 2 |
| OBJECT OB3 | SECOND OBJECT INFORMATION | 2 |
| OBJECT OB4 | FIRST OBJECT INFORMATION | 3 |
| ... | ... | ... |

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2013/067836 filed Jun. 28, 2013, the contents of all of which are incorporated herein by reference in their entirety.

TECHNICAL FIELD

The present invention relates to techniques for providing information about an object contained in an image.

BACKGROUND ART

For example, Non-Patent Literature 1 discloses a photo search technique for searching items that look similar to an object contained in a photograph taken with a camera of a terminal device and for displaying information about the similar items on the terminal device.

CITATION LIST

Non-Patent Literature

Non-Patent Literature 1: Amazon.com Inc., "Amazon.com Help About the Amazon Price Check App", [online], [retrieved on Jun. 5, 2013], Internet <URL: http://www.amazon.com/gp/help/customer/display.html?nodeId=200777320>

SUMMARY OF INVENTION

Technical Problem

When a plurality of objects appear in an image, a user has to specify an object whose information is to be provided. For some moving images, an object that once appeared on a screen may disappear from the screen with time. Thus, when a user performs an operation to specify an object, the object may have already disappeared. In this case, no information about the object, which the user had intended to specify, can be provided. In such a case, if the user was allowed to perform, for example, a rewind operation, the user could cause the object that has disappeared to appear again and then specify the object. However, some moving images, for example, broadcast on TV or over the Internet are unavailable for such a rewind operation.

In view of the above point, it is an object of the present invention to provide an information processing apparatus, an information processing method, and an information processing program that can provide information about an object even after the object has disappeared from a screen in a moving image unavailable for an operation to move its playback position backward in time.

Solution to Problem

To solve the above problem, according to an exemplary embodiment of the present disclosure an information processing apparatus that includes operation information obtaining means, object information obtaining means, and presentation control means. The operation information obtaining means obtains moving image identification information identifying a moving image unavailable for an operation to move its playback position backward in time, a time at which a specifying operation to specify a position on a display unit was performed to specify an object contained in the moving image displayed on the display unit, and a position specified on the display unit, and further obtains object information indicating the object when the object was specified by the specifying operation. Storage means stores the moving image identification information, the time, the position, and the object information in association with each other for each specifying operation performed by a plurality of users. The object information obtaining means obtains, from the storage means, the object information corresponding to all of the following: the moving image identification information obtained by the operation information obtaining means; a time being within a predetermined period of time starting backward from the time obtained by the operation information obtaining means; and a position being within a predetermined distance from the position obtained by the operation information obtaining means. The presentation control means causes information about an object indicated by the object information obtained by at least one of the operation information obtaining means and the object information obtaining means to be presented to a user who performed the specifying operation.

According to this invention, when someone specified an object within the a predetermined period of time ending at time at which a user performed a specifying operation and the position on the display unit at which the object was specified by the someone is within the predetermined distance from the position specified by the user, information about the object is presented. Thus, information about an object can be provided even after the object has disappeared from a screen.

Another exemplary embodiment of the present disclosure describes the information processing apparatus in which the operation information obtaining means further obtains user identification information identifying the user who performed the specifying operation, and the storage means stores the moving image identification information, the time, the position, the object information, and the user identification information in association with each other. The information processing apparatus further includes user object information obtaining means and tendency identifying means. The user object information obtaining means obtains, from the storage means, the object information corresponding to the user identification information obtained by the operation information obtaining means. The tendency identifying means identifies what object tends to be specified, based on the object information obtained by the user object information obtaining means. The presentation control means controls presentation of information about an object, based on a tendency identified by the tendency identifying means.

According to this invention, the presentation of information about an object is controlled based on what object a user tends to specify. Thus, information about an object that interests a user can be provided.

An exemplary aspect of the present disclosure describes the information processing apparatus in which the presentation control means causes information about an object whose degree of match with the tendency identified by the tendency identifying means is less than a predetermined value not to be presented.

This invention can provide only information about an object that is likely to interest a user.

Another exemplary aspect of the present disclosure describes the information processing apparatus in which the presentation control means causes information about objects to be presented in descending order of degree of match with the tendency identified by the tendency identifying means.

This invention can preferentially provide information about an object that is likely to interest a user.

Yet another exemplary aspect of the present disclosure describes the information processing apparatus in which, when the operation information obtaining means and the object information obtaining means each obtain the object information, the presentation control means causes information about an object identified by any one of a plurality of obtained pieces of the object information to be presented. If the presented information has been presented for less than a predetermined time, the presentation control means causes information about an object identified by another one of the obtained pieces of object information to be presented.

According to this invention, when there are an object specified by a user and an object specified by someone within the period of time from the predetermined before to the time at which the user performed the specifying operation, information about either one of these objects is presented. If the presentation of the information ends before the predetermined time has elapsed since then, information about the other is presented. Thus, when information about an object that a user intended to specify is presented first, information about an object that the user did not intend to specify can be prevented from being presented.

Yet another exemplary aspect of the present disclosure describes the information processing apparatus further including sending means. The sending means sends, to a terminal device that displays the moving image, information for increasing the visibility, on the display unit, of an object indicated by the object information obtained by the operation information obtaining means.

According to this invention, when someone specifies an object, the visibility of the specified object is increased on the display screen of the moving image on the terminal device. This can make the user more likely to notice the object being shown in the moving image. Accordingly, the user can more easily specify the object.

Yet another exemplary aspect of the present disclosure describes the information processing apparatus further including attribute identifying means and identification information obtaining means. The attribute identifying means identifies an attribute of the object indicated by the object information obtained by the operation information obtaining means. The storage means stores the moving image identification information, the time, the position, the object information, and user identification information identifying the user who performed the specifying operation in association with each other. The identification information obtaining means obtains, from the storage means, the user identification information corresponding to the object information indicating an object having the attribute identified by the attribute identifying means. The sending means sends the information for increasing the visibility to a terminal device used by a user identified by the user identification information obtained by the identification information obtaining means.

According to this invention, when someone specifies an object, the object specified by the someone becomes more visible on a terminal device used by a user who has specified an object having the same attribute as the specified object before. Thus, only an object that is likely to interest a user can become more visible.

Yet another exemplary aspect of the present disclosure describes the information processing apparatus in which the operation information obtaining means further obtains method information indicating how the specifying operation was performed, and the object information obtaining means determines the length of the period of time, based on the method information obtained by the operation information obtaining means.

According to this invention, an operation method can adjust how long to go backward from the time at which the specifying operation was performed. This can increase the probability that an object that the user intended to specify can be identified correctly.

Yet another exemplary aspect of the present disclosure describes an information processing method performed by a computer. The method includes an operation information obtaining step, an object information obtaining step, and a presentation control step. In the operation information obtaining step, moving image identification information identifying a moving image unavailable for an operation to move its playback position backward in time, a time at which a specifying operation to specify a position on a display unit was performed to specify an object contained in the moving image displayed on the display unit, and a position specified on the display unit are obtained. When the object was specified by the specifying operation, object information indicating the object is further obtained. In the object information obtaining step, the object information corresponding to all of the following: the moving image identification information obtained in the operation information obtaining step; a time being within a predetermined period of time starting backward from the time obtained in the operation information obtaining step; and a position being within a predetermined distance from the position obtained in the operation information obtaining step is obtained from storage means for storing the moving image identification information, the time, the position, and the object information in association with each other for each specifying operation performed by a plurality of users. In the presentation control step, information about an object indicated by the object information obtained in at least one of the operation information obtaining step and the object information obtaining step is presented to a user who performed the specifying operation.

Yet another exemplary aspect of the present disclosure describes an information processing program that causes a computer to execute operation information obtaining means, object information obtaining means, and presentation control means. The operation information obtaining means obtains moving image identification information identifying a moving image unavailable for an operation to move its playback position backward in time, a time at which a specifying operation to specify a position on a display unit was performed to specify an object contained in the moving image displayed on the display unit, and a position specified on the display unit, and for further obtaining object information indicating the object when the object was specified by the specifying operation. The object information obtaining means obtains, from storage means for storing the moving image identification information, the time, the position, and the object information in association with each other for each specifying operation performed by a plurality of users, the object information corresponding to all of the following: the moving image identification information obtained by the operation information obtaining means; a time being within a predetermined period of time starting backward from the time obtained by the operation information obtaining means; and a position being within a predetermined distance from the position obtained by the operation information obtaining means. The presentation control means for causing information about an object indicated by the object information obtained by at least one of the operation information obtaining means and the object information obtaining means to be presented to a user who performed the specifying operation.

Advantageous Effects of Invention

According to the present invention, when a first user, who is different from a second user, specified an object within the predetermined period of time ending at the time before to the time at which the second user performed a specifying operation and the position on the display unit at which the object was specified by the first user is within the predetermined distance from the position specified by the second user, information about the object is presented. Thus, information about an object can be provided even after the object has disappeared from a screen.

BRIEF DESCRIPTION OF DRAWINGS

FIGS. 2A and 2B are diagrams showing an example of how information is provided when a user U1 specifies an object.

FIGS. 2C to 2E are diagrams showing an example of how information is provided when a user U2 fails to specify an object.

FIGS. 4A to 4C are diagrams showing another example of how information is provided when a user specifies an object.

FIGS. 5A and 5B are diagrams showing an example display screen of a moving image that displays information for increasing the visibility of an object.

FIG. 5C is a diagram showing an example display of a guidance MSG.

FIG. 6A is a block diagram schematically showing an example configuration of a moving image distribution server 1 according to an embodiment.

FIG. 6B is a diagram showing example functional blocks of a moving image distribution server 1 according to an embodiment.

FIG. 7A is a diagram showing example contents stored in a specifying operation information DB 12a.

FIG. 7B is a diagram showing example contents stored in a search results DB 12b.

FIG. 7C is a diagram showing example contents stored in a viewing history DB 12c.

FIG. 7D is a diagram showing example contents stored in a genre information DB 2a.

FIG. 7E is a diagram showing example contents stored in an item information DB 2b.

FIG. 7F is a diagram showing example contents stored in an operation history DB 2c.

FIG. 7G is a diagram showing example contents stored in a member information DB 3a.

FIG. 10 is a diagram showing example contents of a display order list.

DESCRIPTION OF EMBODIMENTS

The following describes embodiments of the present invention in detail with reference to the drawings. The embodiments described below are embodiments in which the present invention is applied to an information processing system.

Figure 1:
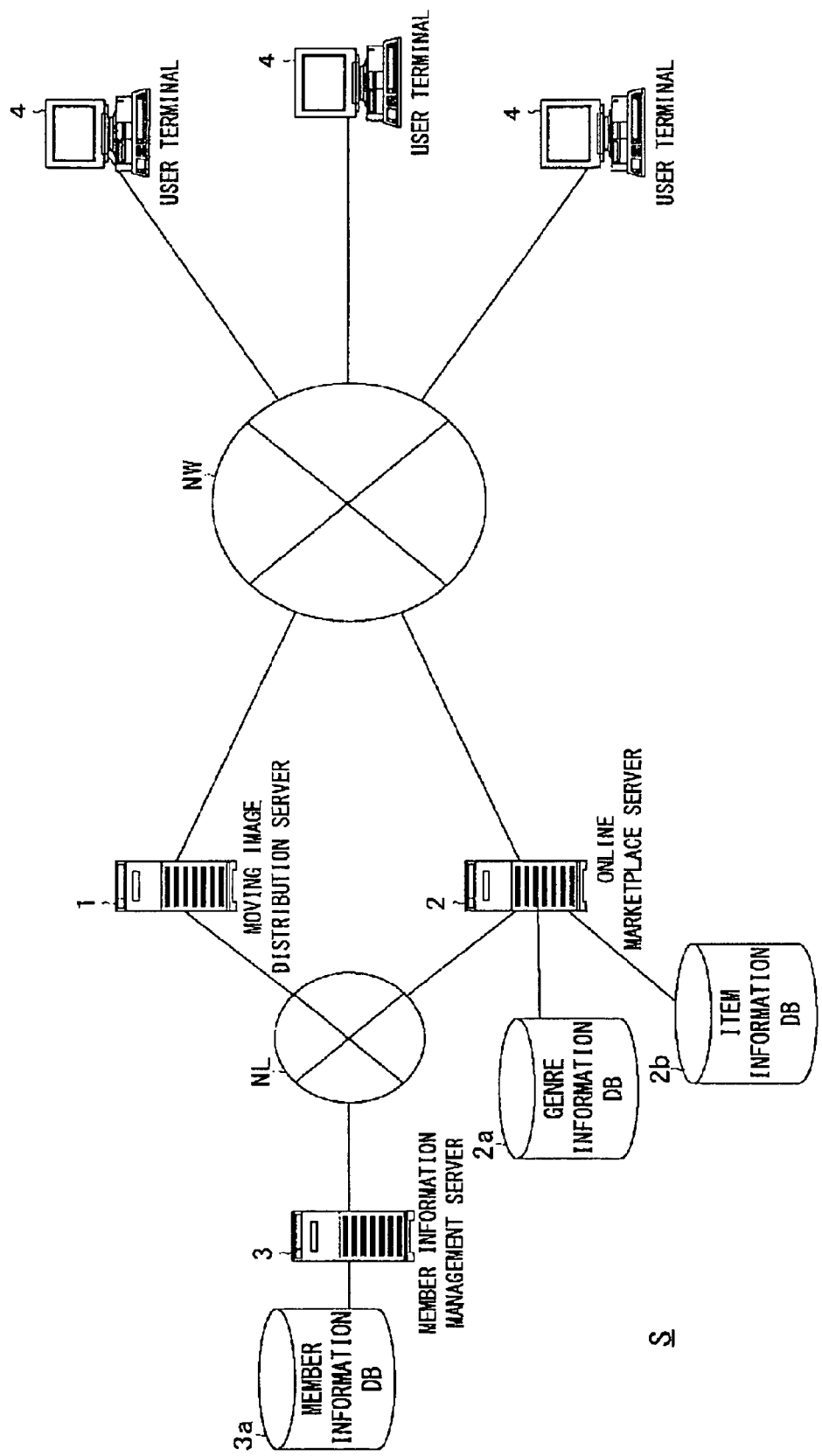
FIG. 1 is a diagram schematically showing an example configuration of an information processing system S according to an embodiment.

1. First Embodiment 1-1. Configuration and Functional Overview of Information Processing System First, a configuration of an information processing system S according to this embodiment will be described with reference to FIG. 1. FIG. 1 is a diagram schematically showing an example configuration of the information processing system S according to this embodiment.

As shown in FIG. 1, the information processing system S includes a moving image distribution server 1, an online marketplace server 2, a member information management server 3, and a plurality of user terminals 4. The moving image distribution server 1 and the online marketplace server 2 can exchange data with each user terminal 4 over a network NW using communication protocols, such as TCP/IP. The network NW includes, for example, the Internet, a dedicated communication line (e.g., community antenna television (CATV) line), a mobile communication network (including base stations), and a gateway. The moving image distribution server 1, the online marketplace server 2, and the member information management server 3 can exchange data with each other over a network NL. The network NL is, for example, a local area network (LAN).

The moving image distribution server 1, the online marketplace server 2, and the member information management server 3 are each a server device belonging to the domain of a comprehensive site for providing comprehensive Internet services. The comprehensive site is a website for providing various services to users over a network.

The moving image distribution server 1 is a server device that performs various processes for a moving image site. The moving image distribution server 1 is an example of an information processing apparatus according to the present invention. The moving image distribution server 1 simultaneously distributes a moving image to a plurality of user terminals 4. For example, a moving image is broadcast. For example, the moving image distribution server 1 may stream a moving image live. For example, the moving image distribution server 1 may relay a moving image taken with a video camera owned by a broadcasting station or a user to the user terminals 4. This enables a plurality of users to watch the same moving image at the same time. In this case, the moving image distribution server 1 does not prestore the moving image to be distributed. The moving image distribution server 1 may prestore a moving image and simultaneously distribute the prestored moving image to a plurality of user terminals 4. Also in this case, for example, the moving image distribution server 1 simultaneously broadcasts the moving image to the plurality of user terminals 4. Thus, user are not allowed to perform any operation, such as a rewind operation or a skip operation, to move the playback position of a moving image on the user terminals 4.

The online marketplace server 2 is a server device that performs various processes for an online marketplace in which items can be purchased. Users can purchase any desired item from any desired store in the online marketplace. For example, the online marketplace server 2 sends web pages of the online marketplace and performs processes for item searches and purchases in response to requests from the user terminals 4. The online marketplace server 2 includes a genre information DB 2a, an item information DB 2b, and other databases. "DB" is an abbreviation for database. The genre information DB 2a stores genre information about each item genre. The item information DB 2b stores item information about each item being sold in the online marketplace. The moving image distribution server 1 accesses the genre information DB 2a, the item information DB 2b, and other databases via the online marketplace server 2.

The member information management server 3 is a server device that manages information about each user who has signed up for the comprehensive site as member information. The member information management server 3 includes a member information DB 3a. The member information DB 3a stores the member information of each user. The moving image distribution server 1 and the online marketplace server 2 each access the member information DB 3a via the member information management server 3.

The user terminal 4 is a terminal device of a user who uses various websites. The user terminal 4 accesses a server device, such as the moving image distribution server 1 or the online marketplace server 2, in response to an operation by a user. The user terminal 4 receives, for example, a web page and a moving image from the server device and then displays them. The user terminal 4 has software, such as a browser and an e-mail client, installed on it. The user terminal 4 may display the moving image, for example, with an add-on program for the browser or with a predetermined moving image player program. For example, a personal computer, a personal digital assistant (PDA), a portable information terminal such as a smartphone, or a mobile phone is used as the user terminal 4.

1-2. Provision of Information about Object being Shown in Moving Image

A moving image distributed from the moving image distribution server 1 shows various objects shot with, for example, a video camera. Examples of the objects include non-living objects and living objects, such as human beings. A user, who is watching a moving image with the user terminal 4, can perform an operation to specify an object displayed on the screen. This operation is referred to as an object specifying operation. Examples of the object specifying operation include an operation to tap a touch screen with a finger, a stylus pen, or the like at the position where an object is being displayed, and an operation to move a pointer with a mouse, cursor keys, or the like and press a button with the pointer positioned over an, object being displayed on the screen. The moving image distribution server 1 provides information about the specified object. This enables the user to obtain, for example, information about an object that interests the user. Specifically, the user terminal 4 recognizes the object specified by the user from an image. For example, the user terminal 4 may recognize the specified object by a known image recognition technique. Alternatively, the user terminal 4 may request a predetermined server device to recognize the object. The user terminal 4 obtains object information by recognizing the object. The object information is information indicating the object. For example, the object information may be a keyword indicating the name of the object or may be identification information indicating an item genre to which the object belongs. Subsequently, the user terminal 4 sends specifying operation information including the object information to the moving image distribution server 1. The specifying operation information is information about the object specifying operation. For example, the user terminal 4 may send the specifying operation information by the moving image player program or by a predetermined program executed together with the moving image player program. Based on the object information, the moving image distribution server 1 searches the online marketplace for items related to the specified object. Then, the moving image distribution server 1 provides a list of found items.

Figure 3:
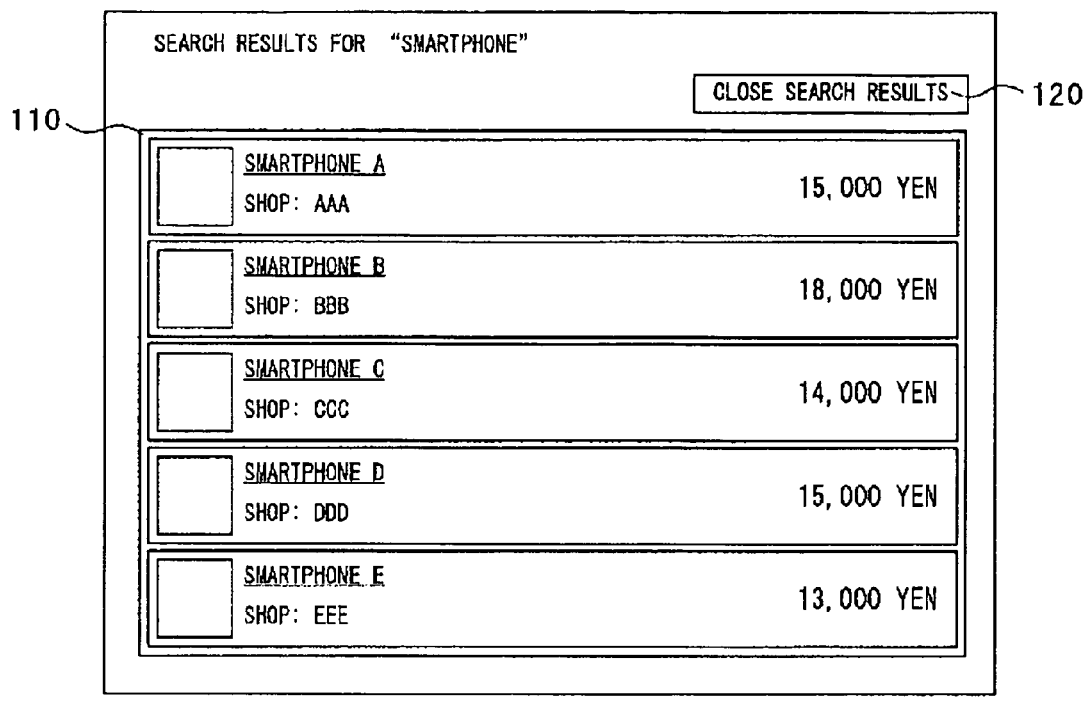
FIG. 3 is a diagram showing an example display of a search results screen.

FIGS. 2A and 2B are diagrams showing an example of how information is provided when a user U1 specifies an object. FIG. 2A is an example display screen of a moving image. As shown in FIG. 2A, the moving image on the screen is showing a smartphone OB1. Here, the user U1 moves a mouse pointer MP and specifies the smartphone OB1, for example, by operating a mouse. After the playback of the moving image ends, the moving image distribution server 1 searches the online marketplace for smartphones as items. Then, as shown in FIG. 2B, the results of the search for smartphones are displayed on the screen of the user terminal 4 used by the user U1. FIG. 3 is a diagram showing an example display of a search results screen. The search results screen is an example of information about an object of the present invention. The search results screen may be, for example, a web page. The search results screen displays, for example, a search results area 110 and a button 120. In the search results area 110, a list of found items is displayed. For example, for each of the items, the item's name, image, price, and the name of the store that sells the item are displayed. If a user selects any one of the items from the search results area 110, an item page is displayed on the screen of the user terminal 4. The item page is a page that displays information about the selected item. The information displayed on the item page is more detailed than the information displayed on the search results page. A purchase operation on the item page enables the user to purchase the item corresponding to the item page. When the user selects the button 120, the search results screen being displayed is cleared from the screen. If the user selects a plurality of objects during playback of the moving image, another search results screen is displayed on the screen when the button 120 is selected. For example, assume that the user specifies a smartphone and a personal computer. Then, a search results screen corresponding to the smartphone is displayed first. When the button 120 is selected, the search results screen corresponding to the smartphone is cleared, and then a search results screen corresponds to the personal computer is displayed.

During playback of a moving image, the scene may sometimes change. Also while a moving image is being taken, some objects move and the shooting angle changes.

Thus, various objects appear on and disappear from the screen during playback of a moving image. Consequently, when a user performs an operation to specify an object on the display screen of a moving image, the object may have already disappeared from the screen. In this case, the user fails to view information about the object.

If the user was allowed to move the playback position of the moving image backward, for example, through a rewind operation or a skip operation, the user could cause the object that has disappeared to appear again and thus could specify the object. The playback position is a time position in the moving image, of each of the frame images constituting the moving image. The playback position is indicated by the time that has elapsed since the moving image started to be played back. However, broadcasting is a distribution mode in which the same frame image is simultaneously distributed to a plurality of user terminals 4 on the assumption that a plurality of users watch the same image at the same time. Thus, users are not allowed to perform any operation to move the playback position backward.

For this reason, the moving image distribution server 1 identifies an object that had been displayed on the screen within a predetermined retrospective period of time ending at the time at which an object specifying operation was performed and that had been displayed within a predetermined distance from the position specified by a user on the screen. The time at which the specifying operation was performed may be, for example, the current playback position or the current time. The position specified by the user is expressed, for example, in coordinates on the screen. The time at which the specifying operation was performed is referred to as a specifying time. The position that was specified is referred to as a specified position.

To identify objects, the moving image distribution server 1 stores specifying operation information sent from each user terminal 4. As described above, every time a user performs an object specifying operation, the user terminal 4 sends specifying operation information to the moving image distribution server 1. The specifying operation information includes, for example, a moving image ID, a user ID, a specifying time, a specified position, and object information. The moving image ID is identification information of a moving image being played back. The moving image ID is an example of moving image identification information of the present invention. The user ID is identification information of the user who performed the object specifying operation. The user ID is an example of user identification information of the present. invention. From the specifying operation information, the moving image distribution server 1 can identify when and where what object was displayed. The moving image distribution server 1 need not perform any image recognition process on moving images to identify objects. For live streaming in particular, image recognition needs to be performed during or after relay of a moving image. However, the moving image distribution server 1 need not perform such a process.

FIGS. 2C to 2E are diagrams showing an example of how information is provided when a user U2 fails to specify an object. Assume that the users U1 and U2 are simultaneously watching the same moving image on mutually different user terminals 4. FIGS. 2C and 2D are each an example display screen of the moving image. As shown in FIG. 2C, the same image as that shown in FIG. 2A is being displayed on the user terminal 4 used by the user U2. That is, the smartphone OB1 is being displayed on the screen. Here, the user U2 performs an operation to specify the smartphone OB1. However, when the user U2 actually performs an object specifying operation, the scene has already been changed as shown in FIG. 2D. Consequently, the smartphone OB1 is no longer displayed at the position specified by the user U2. In this case, the user terminal 4 used by the user U2 sends specifying operation information including no object information. Based on the specifying operation information received from the user terminal 4 used by the user U2 and the stored specifying operation information, the moving image distribution server 1 identifies an object that had been displayed within the retrospective period of time from the predetermined before to the specifying time and within the predetermined distance from the specified position. The moving image distribution server 1 has previously received specifying operation information from the user terminal 4 used by the user U1. Thus, the moving image distribution server 1 obtains object information indicating a smartphone from the specifying operation information. Consequently, as shown in FIG. 2E, search results for a smartphone are displayed on the screen of the user terminal 4 used by the user U2.

The user U2 can select any one smartphone from among the search results to cause the corresponding item page to be displayed and purchase the smartphone. Thus, the user U1 specifies the smartphone OB1, and this triggers the user U2 to purchase the item. That is, the user U1 provides an opportunity for transaction of the item. For this reason, when a user views search results for an object that another person specified within the predetermined retrospective period of time ending at the time at which the user performed an object specifying operation and then purchases an item, the information processing system S may give reward to the person who specified the object. This system is a form of an affiliate program. For example, the online marketplace server 2 may perform a process for giving the reward. The reward may be, for example, points that can be used to purchase items in the online marketplace, money, or items.

Here, object information indicating the object actually specified by the user is referred to as first object information. Object information indicating the object identified by the moving image distribution server 1 is referred to as second object information.

FIGS. 4A to 4C are diagrams showing another example of how information is provided when a user specifies an object. FIGS. 4A and 4B are each an example display screen of a moving image. As shown in FIG. 4A, the smartphone OB1 is being displayed on the screen. Assume that, within the retrospective period of time after that, as shown in FIG. 4B, a personal computer OB2 is displayed at the position where the smartphone OB1 has been displayed. Here, assume that the user specifies the personal computer OB2. Seemingly, the personal computer OB2 is specified. In this case, however, the user may have intended to specify the personal computer OB2, or the user may have intended to specify the smartphone OB1.

Thus, as shown in FIG. 4C, the moving image distribution server 1 may provide both a search results screen for the specified object and a search results screen for the identified object. Alternatively, for example, the moving image distribution server 1 may cause one of the search results screens to be displayed first, and then cause the other search results screen to be displayed when the button 120 is selected. In this case, the moving image distribution server 1 may cause either one of the search results screens to be displayed first. Alternatively, the moving image distribution server 1 may cause both of the search results screen to be displayed together.

Alternatively, the moving image distribution server 1 may cause either one of the search results screens to be displayed. In this case, the moving image distribution server 1 may cause either the search results screen for the specified object or the search results screen for the identified object to be displayed. Then, if the button 120 is selected before a predetermined time has elapsed since one search results screen was displayed, the moving image distribution server 1 may cause the other search results screen to be displayed. On the other hand, if the button 120 is selected after the predetermined time has elapsed, the moving image distribution server 1 need not cause the other search results screen to be displayed. The reason is that the user probably did not intend to specify the object corresponding to the search results screen that the user viewed for a short time. That is, the user probably intended to specify the object corresponding to the search results screen to be displayed later. When a search results screen for an object that the user did not intend to specify is being displayed, the search results screen is unnecessary to the user. Thus, the user clears the search results screen in a relatively short time. On the other hand, when a search results screen for an object that the user intended to specify is being displayed, the user selects an item referring to the search results screen. Accordingly, the user spends more time viewing the search results screen.

FIGS. 5A and 5B are diagrams showing an example display screen of a moving image that displays information for increasing the visibility of an object. While watching a moving image, a user may sometimes be unaware of some objects being displayed on the screen. Consequently, the user may fail to specify an object that interests the user. Thus, the moving image distribution server 1 may cause visibility-increasing information to be displayed on the display screen of the moving image. The visibility-increasing information is information for increasing the visibility of an object specified by any user. As shown in FIG. 5A, assume that a user specifies the smartphone OB1 while the smartphone OB1 is being displayed on the screen. Then, visibility-increasing information FR is displayed on the display screen of the moving image being played back by each user's user terminal 4. The visibility-increasing information FR is displayed at the same position that the user specified on the screen. This makes the smartphone OB1 more likely to be noticed. The visibility-increasing information FR is displayed for a predetermined duration of time after the object specifying operation was performed. Thus, as shown in FIG. 5B, even after the smartphone OB1 disappears from the screen, the visibility-increasing information FR may remain displayed. This enable users to notice the position where the smartphone OB1 had been displayed. Thus, users can correctly specify the position where the smartphone OB1 had been displayed.

For example, the moving image distribution server 1 may cause all of the user terminals 4 playing back the same moving image as the moving image on which the object specifying operation was performed to display the visibility-increasing information FR. Alternatively, the moving image distribution server 1 may determine whether to display the visibility-increasing information FR, based on what object tends to be specified. For example, the moving image distribution server 1 may cause a first user's user terminal 4 to display the visibility-increasing information FR only when another second user specifies an object having the same attribute as any of the objects that the first user has specified before. Examples of the attribute include genre to which objects belong, price, specification, functions, performance, capacity, size, and weight. This can make a user more likely to notice an object that probably interests the user and also can prevent an object that is unlikely to interest the user from becoming more visible and obtrusive to the user. The moving image distribution server 1 may or may not cause the user terminal 4 used by the user who actually specified the object to display the visibility-increasing information FR for the specified object.

A plurality of users may specify the same object at the same time. In this case, for example, for each object specifying operation, the moving image distribution server 1 may cause the corresponding visibility-increasing information FR to be displayed. For a plurality of object specifying operations whose specified position is within a predetermined range, the moving image distribution server 1 may cause one piece of visibility-increasing information FR to be displayed. In this case, the moving image distribution server 1 may keep the visibility-increasing information FR displayed for a predetermined duration of time after the last object specifying operation was performed.

In the example of FIGS. 5A and 5B, the visibility-increasing information FR is a circular frame. However, the visibility-increasing information FR may be, for example, a graphic with a shape different from a circular shape.

The retrospective period of time used for the moving image distribution server 1 to identify an object, for example, may be preset. Alternatively, the moving image distribution server 1 may determine the retrospective period of time variably depending on how a user performed an object specifying operation. For example, the longer the user presses a mouse button or a touch screen to specify an object, the longer the retrospective period of time may be determined to be. Alternatively, for example, the retrospective period of time may be adjusted by the user pressing the mouse button or the touch screen to specify the object and then moving a mouse pointer or the user's finger in a predetermined direction or in an arbitrary direction. In this case, for example, the longer the moving distance is, the longer the retrospective period of time may be determined to be. The specifying operation information further includes operation method information. The operation method information indicates how the object specifying operation was performed. For example, the operation method information may indicate how long the mouse button or the touch screen was pressed or how far the mouse pointer or the finger was moved. The moving image distribution server 1 may cause the user terminal 4 to display a guidance while the user is performing the object specifying operation. This guidance is information explaining an operation method for adjusting the retrospective period of time. For example, as shown in FIG. 5C, a guidance MSG is displayed on the display screen of the moving image. The guidance MSG may be, for example, the message "The longer you press and hold here, the further you can go back in time and specify an object". The guidance may be displayed outside the display screen of the moving image.

1-3. Configuration of Each Server Device

The following describes a configuration of each server device with reference to FIGS. 6A to 7G.

1-3-1. Configuration of Moving Image Distribution Server

FIG. 6A is a block diagram schematically showing an example configuration of the moving image distribution server 1 according to this embodiment. As shown in FIG. 6, the moving image distribution server 1 includes a communication unit 11, a storage unit 12, an input/output interface 13, and a system controller 14. The system controller 14 and the input/output interface 13 are connected via a system bus 15.

The communication unit 11 connects to the networks NW and NL, and controls the state of communications with, for example, other server devices and the user terminals 4.

The storage unit 12 includes, for example, hard disk drives. The storage unit 12 is an example of storage means of the present invention. In this storage unit 12, a specifying operation information DB 12a, a search results DB 12b, a viewing history DB 12c, and other databases are created.

FIG. 7A is a diagram showing example contents stored in the specifying operation information DB 12a. The specifying operation information DB 12a stores specifying operation information sent from the user terminal 4 as specifying information. Specifically, information the specifying operation information DB 12a stores a moving image ID, a user ID, a specifying time, a specified position, operation method information, first object information, second object information, an object-providing user ID, and other information in association with each other. When the specifying operation information that the moving image distribution server 1 received from the user terminal 4 is stored in the specifying operation information DB 12a, for example, the second object information and the object-providing user ID are added to the specifying operation information as needed. The first object information is the object information included in the specifying operation information received by the moving image distribution server 1. The second object information indicates an object that had been displayed within the retrospective period of time ending at the specifying time and within the predetermined distance from the specified position. The object-providing user ID is identification information of the user who actually specified the object indicated by the second object information. The object-providing user ID is information required to identify which user reward is given to.

FIG. 7B is a diagram showing example contents stored in the search results DB 12b. The search results DB 12b stores information about search results for items related to objects specified by users. Specifically, every time a search is performed, a moving image ID, object information, search results information, and other information are stored in the search results DB 12b. The moving image ID indicates a moving image containing an object that was specified. The object information indicates the specified object. The search results information is information about found items. The search results information is also information used for the user terminal 4 to display a search results screen. For example, the search results screen may be written in hypertext markup language (HTML), extensible markup language (XML), or other languages.

FIG. 7C is a diagram showing example contents stored in the viewing history DB 12c. The viewing history DB 12c stores viewing logs of search results screens. Specifically, every time a search results screen is viewed, for example, a user ID, a viewed date and time, a moving image ID, object information, and one or more item IDs are stored in association with each other in the viewing history DB 12c. The user ID indicates the user who viewed the search results screen. The viewed date and time indicates the date and time at which the search results screen was viewed. The combination of the moving image ID and the object information corresponds to the viewed search results screen. The item ID(s) are piece(s) of identification information indicating item(s) whose information was actually displayed, in the search results screen. While the search results screen is being displayed, the user terminal 4 sends the user ID, the moving image ID, the object information, the item ID(s), and other information to the moving image distribution server 1 as needed. The moving image distribution server 1 stores a viewing log based on the received information.

The following describes other information stored in the storage unit 12. The storage unit 12 stores various data, such as HTML documents, XML documents, image data, text data, and electronic documents, for displaying web pages. The storage unit 12 also stores various setting values.

The storage unit 12 also stores various programs, such as an operating system, a streaming server program, a World Wide Web (WWW) server program, a database management system (DBMS), and an object specifying management program. The object specifying management program is a program for performing processes, for example, for recording specifying operation information and for retrieving and providing search results information. The object specifying management program is an example of an information processing program according to the present invention. The various programs may be available from, for example, another server device over the network NW, or may be recorded in a recording medium, such as a digital versatile disc (DVD), and be read via a drive device. The object specifying management program may be a program product.

The input/output interface 13 performs interface processing between the communication unit 11 and the storage unit 12, and the system controller 14.

The system controller 14 includes, for example, a central processing unit (CPU) 14a, a read only memory (ROM) 14b, and a random access memory (RAM) 14c. FIG. 6B is a diagram showing example functional blocks of the moving image distribution server1 according to this embodiment. The object specifying management program and other programs, which are executed by the CPU 14a, enable the system controller 14 to function as, for example, a specifying operation information receiver 141, an object identification unit 142, and an information provider 143, an attribute identification unit 144, and a visibility controller 145. The specifying operation information receiver 141 is an example of operation information obtaining means of the present invention. The object identification unit 142 is an example of object information obtaining means and user object information obtaining means of the present invention. The information provider 143 is an example of presentation control means of the present invention. The attribute identification unit 144 is an example of tendency identifying means and attribute identifying means of the present invention. The visibility controller 145 is an example of sending means and identification information obtaining means of the present invention.

The specifying operation information receiver 141 obtains specifying operation information sent from the user terminal 4 to the moving image distribution server 1 via the communication unit 11. Based on the specifying operation information obtained by the specifying operation information receiver 141, the object identification unit 142 searches the specifying operation information DB 12a for first object information indicating an object that had been displayed within the retrospective period of time ending at the specifying time and within the predetermined distance from the specified position. The object identification unit 142 adds the retrieved first object information as second object information to the specifying operation information obtained by the specifying operation information receiver 141. Then, the object identification unit 142 stores the specifying operation information in the specifying operation information DB 12a. The information provider 143 obtains information about items related to each of the first and second object information included in the specifying operation information stored in the specifying operation information DB 12*a*. Based on the obtained information, the information provider 143 generates search results information. Then, the information provider 143 sends the search results information to the user terminal 4. By sending the search results information, the information provider 143 causes the user terminal 4 to present a search results screen to a user. The attribute identification unit 144 identifies an attribute of the object indicated by the object information included in the specifying operation information. Based on the attribute identified by the attribute identification unit 144, the visibility controller 145 determines to which user visibility-increasing information is to be displayed. Then, the attribute identification unit 145 sends a visibility-increasing information display instruction to the user terminal(s) 4 used by the determined user(s). The visibility-increasing information display instruction is a message indicating an instruction to display the visibility-increasing information. The visibility-increasing information display instruction is an example of information for increasing the visibility of an object in the present invention. Detailed processes in these units are described below.

The moving image distribution server 1 may include a plurality of server devices. For example, a server device that distributes moving images, a server device that performs processes for recording specifying operation information and for retrieving and providing search results information, a server device that manages databases, and other server devices may be connected to each other via a LAN or the like.

1-3-2. Configuration of Online Marketplace Server

The online marketplace server 2 includes, for example, a system controller, a storage unit, and a communication unit. The system controller includes, for example, a CPU. The storage unit includes, for example, hard disk drives. In the storage unit of the online marketplace server 2, a genre information DB 2*a*, an item information DB 2*b*, an operation history DB 2*c*, and other databases are created.

FIG. 7D is a diagram showing example contents stored in the genre information DB 2*a*. The genre information DB 2*a* stores genre information about each item genre. Specifically, the genre information DB 2*a* stores, for each genre, attributes of the genre, such as a genre ID, a genre name, the level of the genre, a parent genre ID, a child genre ID list, and attribute information, in association with each other. The genre information is set, for example, by an administrator of the online marketplace.

The item genres are hierarchically defined to have a tree structure. Specifically, each node of the tree structure corresponds to a genre. The depth of a node corresponds to the level (layer) of the genre corresponding to the node. The depth of a node is the distance from the node at the root (hereinafter, referred to as "root node"). The larger the value of the level is, the deeper the depth of the level is. The smaller the value of the level is, the shallower the depth of the level is. Genres corresponding to child nodes that the root node has are Level 1 genres. The Level 1 genres are the top level genres. For each of the Level 1 genres, genres corresponding to its child nodes are defined as Level 2 genres. Here, a genre C2 corresponding to a child node of a genre C1 is referred to as a child genre of the genre C1. This genre C1 is referred to as the parent genre of the genre C2. Child genres are a plurality of subgenres into which a parent genre is further divided and are each a range to which similar items belong. Thus, the child genres belong to the parent genre. When a genre C3 is a child node of the genre C2, the genre C3 is referred to as a descendant genre of the genre C1. The genre C1 is referred to as an ancestor genre of the genre C3. The descendant genre belongs to the ancestor genre.

The genre ID is identification information of a genre defined by the genre information. The parent genre ID is the genre ID of the parent genre of the genre defined by the genre information. The child genre ID list is a list of the child genres of the genre defined by the genre information. The child genre ID list is set when the genre defined by the genre information has child genres. The attribute information is information indicating item attributes indicated by the genre defined by the genre information. The attribute information includes, for each attribute, a pair of an attribute name and an attribute value. When an attribute value or an attribute value range can be identified from the genre, the attribute information is stored. For example, smartphones have the attribute "screen pixel resolution". However, no pixel resolution can be identified from the genre "smartphone". On the other hand, if a smartphone model is identified from the genre, its pixel resolution can be identified.

FIG. 7E is a diagram showing example contents stored in the item information DB 2*b*. The item information DB 2*b* stores item information. Specifically, the item information DB 2*b* stores, for each item that each store sells, a store ID, an item ID, a genre ID, an item name, the uniform resource locator(s) (URL(s)) of item image(s), an item description, an item price, and other item attributes in association with each other. The item ID is identification information of the item and is used for the store to manage the item for sale. The store ID indicates a store that sells the item. The genre ID is the genre ID of a genre to which the item belongs.

FIG. 7F is a diagram showing example contents stored in the operation history DB 2*c*. The operation history DB 2*c* stores logs of user operations in the online marketplace. Specifically, for example, a user ID, an operation date and time, and a URL are stored as an operation log in the operation history DB 2*c*, every time the online marketplace server 2 receives a request sent from the user terminal 4 in response to an operation performed by a user. The user ID indicates the user who performed the operation. The operation date and time indicates the date and time at which the operation was performed. The URL is the URL set in the request sent from the user terminal 4. From the URL set in the request, the online marketplace server 2 can identify, for example, the operation performed by the user and the item for which the operation is intended. Examples of the user operation include an operation to view an item page and an operation to purchase an item.

The online marketplace server 2 can trace a user operation in the moving image site and in the online marketplace, for example, based on the specifying operation information DB 12*a*, the viewing history DB 12*c*, and the operation history DB 2*c*. Thus, the online marketplace server 2 can identify a trigger for item purchase. When a user views search results for an object that another person specified within the retrospective period of time ending at the time at which the user performed an object specifying operation and then purchases an item in the online marketplace, the online marketplace server 2 performs a process for giving, for example, points to the user who specified the object.

1-3-3. Configuration of Member Information Management Server

The member information management server 3 includes, for example, a system controller, a storage unit, and a communication unit. The system controller includes, for example, a CPU. The storage unit includes, for example, hard disk drives. In the storage unit of the online marketplace server 3, a member information DB 3a is created.

FIG. 7G is a diagram showing example contents stored in the member information DB 3a. The member information DB 3a stores the member information of each user who has signed up for the comprehensive site. Specifically, the member information DB 3a stores, for each user, the user's user ID, password, nickname, name, birth date, gender, zip code, address, telephone number, e-mail address, the number of the user's points, and other user attributes in association with each other. The number of the user's points is the number of points that the user has.

1-4. Operation of Information Processing System

The following describes an operation of the information processing system S with reference to FIGS. 8 to 11. For purposes of this description, assume that object information is a keyword indicating an object name.

Figure 8:
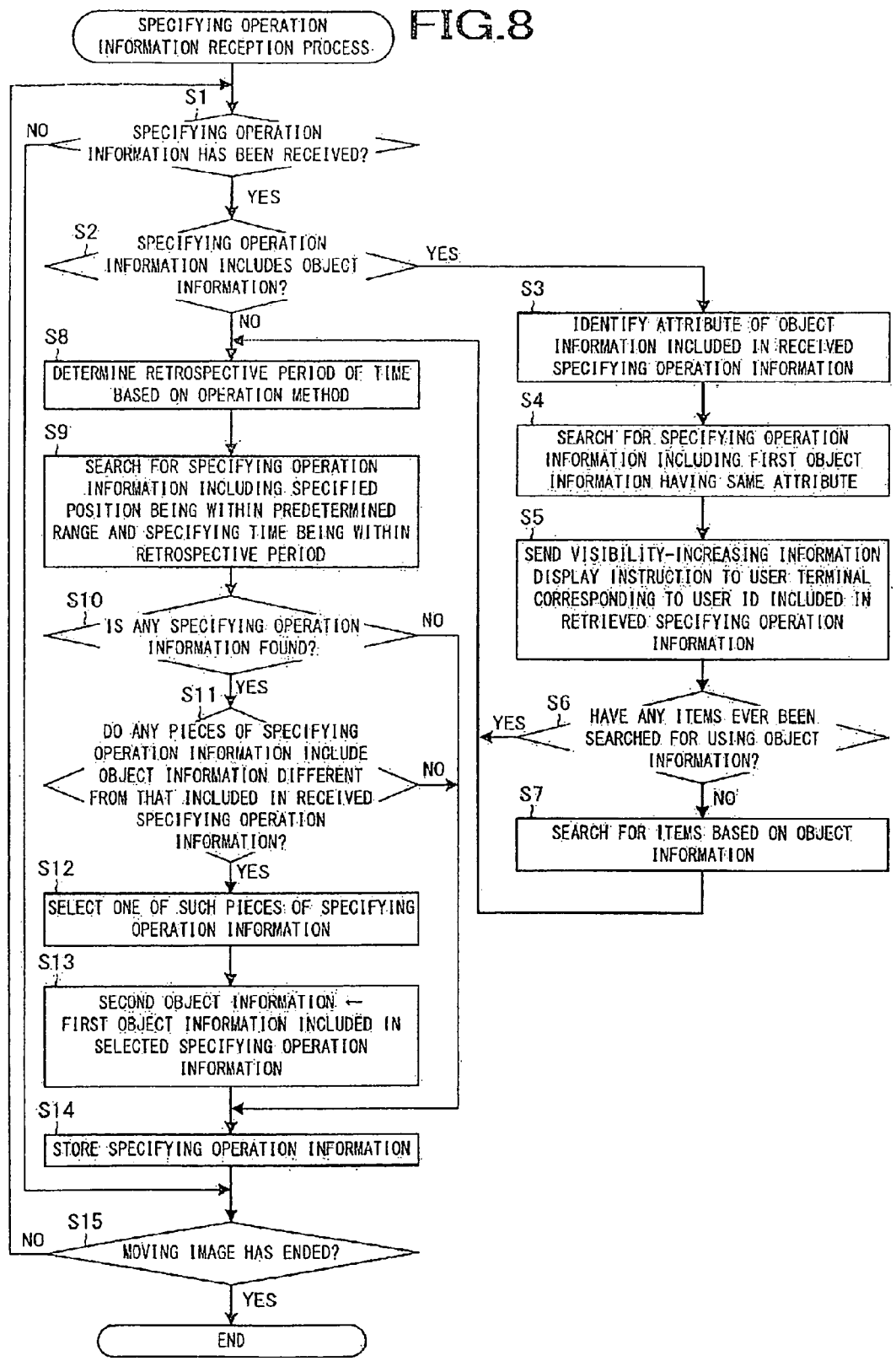
FIG. 8 is a flowchart showing an example process of a specifying operation information reception process in a system controller 14 of the moving image distribution server 1 according to an embodiment.

FIG. 8 is a flowchart showing an example process of a specifying operation information reception process in the system controller 14 of the moving image distribution server 1 according to this embodiment. The moving image distribution server 1 starts distributing a moving image, for example, according to a moving image schedule. The specifying operation information reception process is started at the start of distribution of the moving image.

As shown in FIG. 8, the specifying operation information receiver 141 determines whether specifying operation information has been received from any user terminal 4 to which the moving image is being distributed (Step S1). Here, if the specifying operation information receiver 141 determines that no specifying operation information has been received (NO in Step S1), the process proceeds to Step S15. On the other hand, if the specifying operation information receiver 141 determines that specifying operation information has been received (YES in Step S1), the process proceeds to Step S2. In Step S2, the specifying operation information receiver 141 determines whether the received specifying operation information includes object information. Here, if the specifying operation information receiver 141 determines that the specifying operation information includes no object information (NO in Step S2), the process proceeds to Step S8. On the other hand, if the specifying operation information receiver 141 determines that the specifying operation information includes object information (YES in Step S2), the process proceeds to Step S3.

In Step S3, the attribute identification unit 144 identifies an attribute of the object indicated by the object information included in the received specifying operation information. For example, the attribute identification unit 144 searches the genre information DB 2a for genre names that match the object information. The attribute identification unit 144 retrieves the genre IDs corresponding to the retrieved genre names. Subsequently, the attribute identification unit 144 searches the specifying operation information DB 12a for specifying operation information including first object information indicating an object having the same attribute as the identified attribute (Step S4). For example, the attribute identification unit 144 identifies a genre at a preset level from among the genres to which the object indicated by the object information included in the retrieved specifying operation information belongs, based on the genre IDs retrieved in Step S3 and the genre information DB 2a. The attribute identification unit 144 also searches for specifying operation information including the same moving image ID as the moving image ID included in the received specifying operation information. Then, the attribute identification unit 144 extracts, from among the retrieved pieces of specifying operation information, specifying operation information including first object information indicating an object belonging to the identified genre. The genre determination can be performed, based on the genre IDs included in the pieces of specifying operation information stored in the specifying operation information DB 12a. The attribute identification unit 144 may use attribute information instead of genre IDs.

Subsequently, the visibility controller 145 sends a visibility-increasing information display instruction to the user terminal(s) 4 used by the user(s) identified by the user ID(s) included in the piece(s) of specifying operation information retrieved in Step 4 (Step S5). Specifically, the visibility controller 145 obtains a specified position from the received specifying operation information. Then, the visibility controller 145 sends a visibility-increasing information display instruction including the obtained specified position. Each user terminal 4, which has received the visibility-increasing information display instruction, obtains the specified position from the visibility-increasing information display instruction. Then, the user terminal 4 displays visibility-increasing information at the specified position on the display screen of the moving image for the predetermined duration of time.

Next, the information provider 143 determines whether any items have ever been searched for using the object information included in the received specifying operation information (Step S6). Specifically, the information provider 143 searches the search results DB 12b for search results information that corresponds to the moving image ID and the object information included in the received specifying operation information. Here, if any corresponding search results information can be retrieved, the information provider 143 determines that items have been searched for before (YES in Step S6). In this case, the information provider 143 causes the process to proceed to Step S8. On the other hand, if no corresponding search results information can be retrieved, the information provider 143 determines that items have never been searched for (NO in Step S6). In this case, the information provider 143 causes the process to proceed to Step S7.

In Step S7, the information provider 143 searches for items, based on the object information included in the received specifying operation information. Specifically, in the same way as described for Step S3, the information provider 143 retrieves the genre IDs corresponding to the object information from the genre information DB 2a. Subsequently, the information provider 143 searches the item information DB 2b for the pieces of item information of the items belonging to the genres indicated by the retrieved genre IDs. Next, search results information is generated based on the retrieved pieces of item information. Then, the information provider 143 stores the moving image ID and the object information included in the received specifying operation information, and the generated search results information in association with each other in the search results DB 12b. After the information provider 143 finishes Step S7, the process proceeds to Step S8. Alternatively, the information provider 143 may request the online marketplace server 2 to search for the items. Then, the information provider 143 may obtain search results information from the online marketplace server 2. Alternatively, the information provider 143 may search for items, for example, using the object information as a keyword. For example, the information provider 143 may search for item information in which the item name or the item description includes the keyword. The information provider 143 may search for the items after distribution of the moving image.

In Step S8, the object identification unit 142 determines a retrospective period of time, based on the operation method information included in the received specifying operation information (Step S8). For example, the object identification unit 142 may calculate the retrospective period of time by multiplying the time or the distance included in the operation method information by a predetermined value.

Subsequently, the object identification unit 142 searches the specifying operation information DB 12*a* for specifying operation information including a specified position being within the predetermined distance from the specified position included in the received specifying operation information and including a specifying time being within the retrospective period of time ending at the specifying time included in the received specifying operation information (Step S9). Then, the object identification unit 142 determines whether any such specifying operation information is found (Step S10). Here, if the object identification unit 142 determines that no such specifying operation information is found (NO in Step S10), the process proceeds to Step S14. On the other hand, if the object identification unit 142 determines that such specifying operation information is found (YES in Step S10), the process proceeds to Step S11. In Step S11, the object identification unit 142 determines whether any of the retrieved pieces of specifying operation information include first object information different from the object information included in the received specifying operation information (Step S11). Here, if the object identification unit 142 determines that no such specifying operation information is found (NO in Step S11), the process proceeds to Step S14. On the other hand, if the object identification unit 142 determines that such specifying operation information is found (YES in Step S11), the process proceeds to Step S12.

In Step S12, the object identification unit 142 selects one of the pieces of specifying operation information including first object information different from the object information included in the received specifying operation information. For example, the object identification unit 142 may select specifying operation information including a specifying time closest to the specifying time included in the received specifying operation information. Subsequently, the object identification unit 142 determines the first object information and the user ID included in the selected specifying operation information as second object information and an object-providing user ID, respectively. Then, the object identification unit 142 adds the second object information and the object-providing user ID to the received specifying operation information (Step S13). After the object identification unit 142 finishes Step S13, the process proceeds to Step S14.

In Step S14, the object identification unit 142 stores the received specifying operation information in the specifying operation information DB 12*a*. At this time, the object information included from the beginning in the received specifying operation information is stored as first object information. After the object identification unit 142 finishes Step S14, the process proceeds to Step S15. Alternatively, the object identification unit 142 may store the received specifying operation information in the specifying operation information DB 12*a* without modification during distribution of the moving image, and may perform Steps S8 to S13 to identify an object after distribution of the moving image.

In Step S15, the specifying operation information receiver 141 determines whether the distribution of the moving image has ended. Here, if the specifying operation information receiver 141 determines that the distribution of the moving image has not yet ended (NO in Step S15), the process proceeds to Step S1. On the other hand, if the specifying operation information receiver 141 determines that the distribution of the moving image has ended (YES in Step S15), the specifying operation information receiver 141 terminates the specifying operation information reception process.

Figure 9:
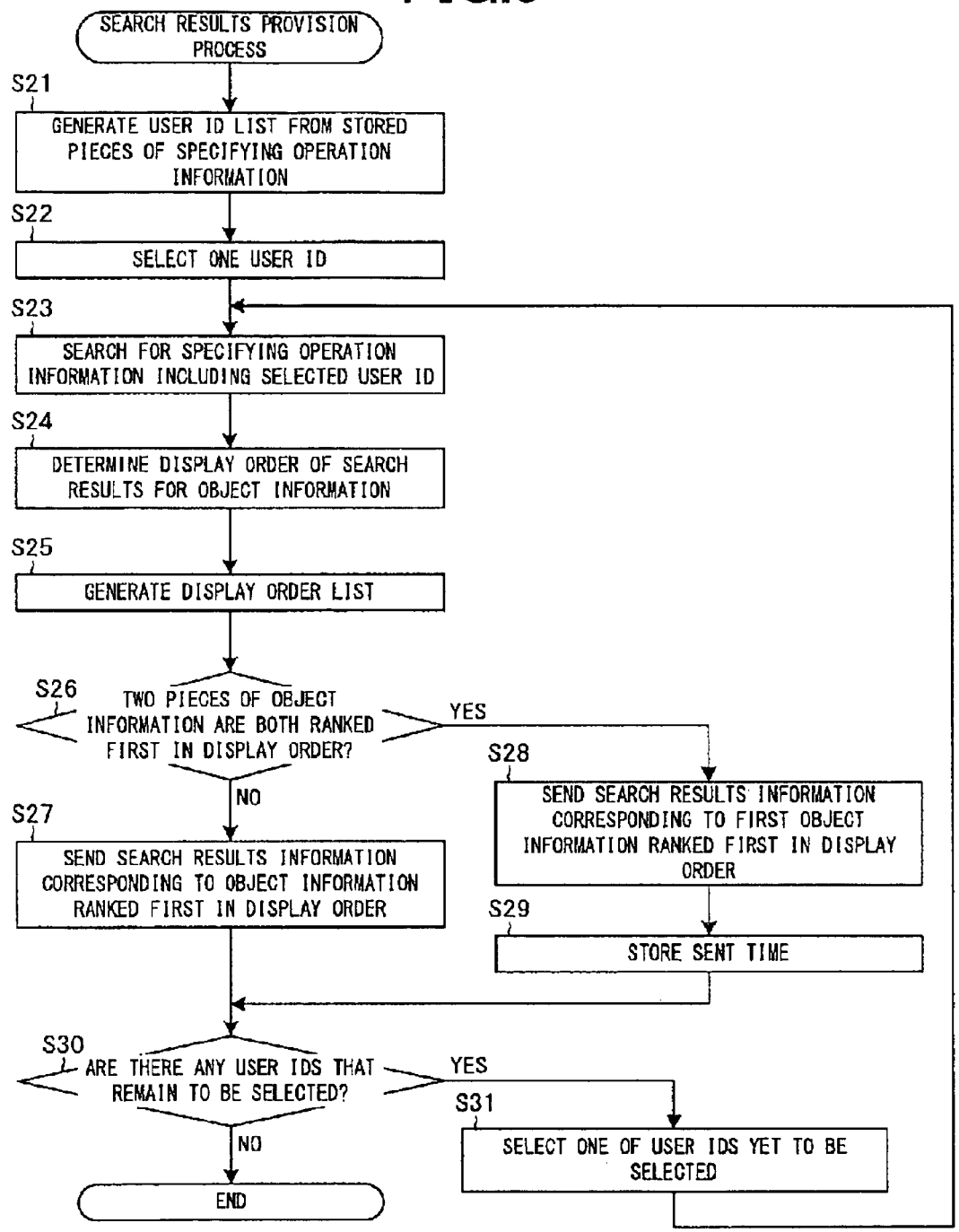
FIG. 9 is a flowchart showing an example process of a search results provision process in the system controller 14 of the moving image distribution server 1 according to an embodiment.

FIG. 9 is a flowchart showing an example process of a search results provision process in the system controller 14 of the moving image distribution server 1 according to this embodiment. The search results provision process is started, for example, at the end of distribution of the moving image.

As shown in FIG. 9, the information provider 143 searches the specifying operation information DB 12*a* for specifying operation information including the moving image ID of the moving image whose distribution has ended. Subsequently, the information provider 143 obtains user IDs from the retrieved pieces of specifying operation information. Then, the information provider 143 generates a list of the obtained user IDs (Step S21). Next, the information provider 143 selects one user ID from the user ID list (Step S22). Subsequently, the information provider 143 searches the specifying operation information DB 12*a* for specifying operation information including both the moving image ID of the moving image whose distribution has ended and the selected user ID (Step S23). Then, the information provider 143 determines the order in which search results screens corresponding to the pieces of object information included in the pieces of specifying operation information retrieved in Step S23 are displayed (Step S24). This order is referred to as a display order. For example, the information provider 143 may determine the display order in ascending order of the specifying time included in the pieces of specifying operation information. Here, specifying operation information may include both first object information and second object information. In this case, the information provider 143 assigns the same rank in the display order to the first object information and the second object information. Also, the same object information may be included in a plurality of pieces of specifying operation information. The information provider 143 determines the display order so that search results are displayed only once for one object.

Subsequently, the information provider 143 generates a display order list (Step S25). Specifically, the information provider 143 generates a list that associates pieces of object information, object types, and ranks in the display order with each other. Each object type indicates whether the corresponding object information is first object information or second object information. The information provider 143 stores the generated list in association with both the moving image ID of the moving image whose distribution has ended and the selected user ID in the storage unit 12. FIG. 10 is a diagram showing example contents of the display order list. In the example of FIG. 10, the rank in the display order of a search results screen corresponding to first object information indicating an object OB1 is set to 1. The rank in the display order of a search results screen corresponding to first object information indicating an object OB2 and the rank in the display order of a search results screen corresponding to second object information indicating an object OB3 are both set to 2. The rank in the display order of a search results screen corresponding to first object information indicating an object OB4 is set to 3. In this case, the search results screen for the object OB1 is displayed first. Then, the search results screen for the object OB2 is displayed. If the search results screen for the object OB2 has been displayed for the predetermined time or more, the search results screen for the object OB4 is displayed third. On the other hand, if the search results screen for the object OB2 has been displayed for less than the predetermined time, the search results screen for the object OB3 is displayed third, and the search results screen for the object OB4 is displayed fourth.

Then, the information provider 143 determines whether two pieces of object information are both ranked first in the display order, based on the display order list (Step S26). Here, if the information provider 143 determines that only one piece of object information is ranked first in the display order (NO in Step S26), the process proceeds to Step S27. On the other hand, if the information provider 143 determines that two piece of object information are both ranked first in the display order (YES in Step S26), the process proceeds to Step S28.

In Step S27, the information provider 143 sends the search results information corresponding to the object information ranked first in the display order to the user terminal 4 used by the user identified by the selected user ID. At this time, the information provider 143 retrieves, from the search results DB 12b, the search results information corresponding to both the object information ranked first in the display order and the moving image ID of the moving image whose distribution has ended. After the information provider 143 finishes Step S27, the process proceeds to Step S30.

In Step S28, the information provider 143 sends the search results information corresponding to the first object information, among the two pieces of object information ranked first in the display order, to the user terminal 4 used by the user identified by the selected user ID. The step of obtaining the search results information is the same as Step S27. Subsequently, the information provider 143 obtains the current time as a sent time. Then, the information provider 143 stores the obtained sent time in association with both the moving image ID of the moving image whose distribution has ended and the selected user ID in the storage unit 12 (Step S29). After the information provider 143 finishes Step S29, the process proceeds to Step S30.

In Step S30, the information provider 143 determines whether there are any user IDs that remain to be selected from the user ID list. Here, if the information provider 143 determines that some of the user IDs remain to be selected (YES in Step S30), the process proceeds to Step S31. In Step S31, the information provider 143 selects one of the user IDs yet to be selected. Then, the information provider 143 causes the process to proceed to Step S23. On the other hand, if the information provider 143 determines that all the user IDs have been selected (NO in Step S30), the information provider 143 terminates the search results provision process. The user terminal 4, which has received the search results information, displays search results, for example, as shown in FIG. 3, based on the search results information.

Figure 11:
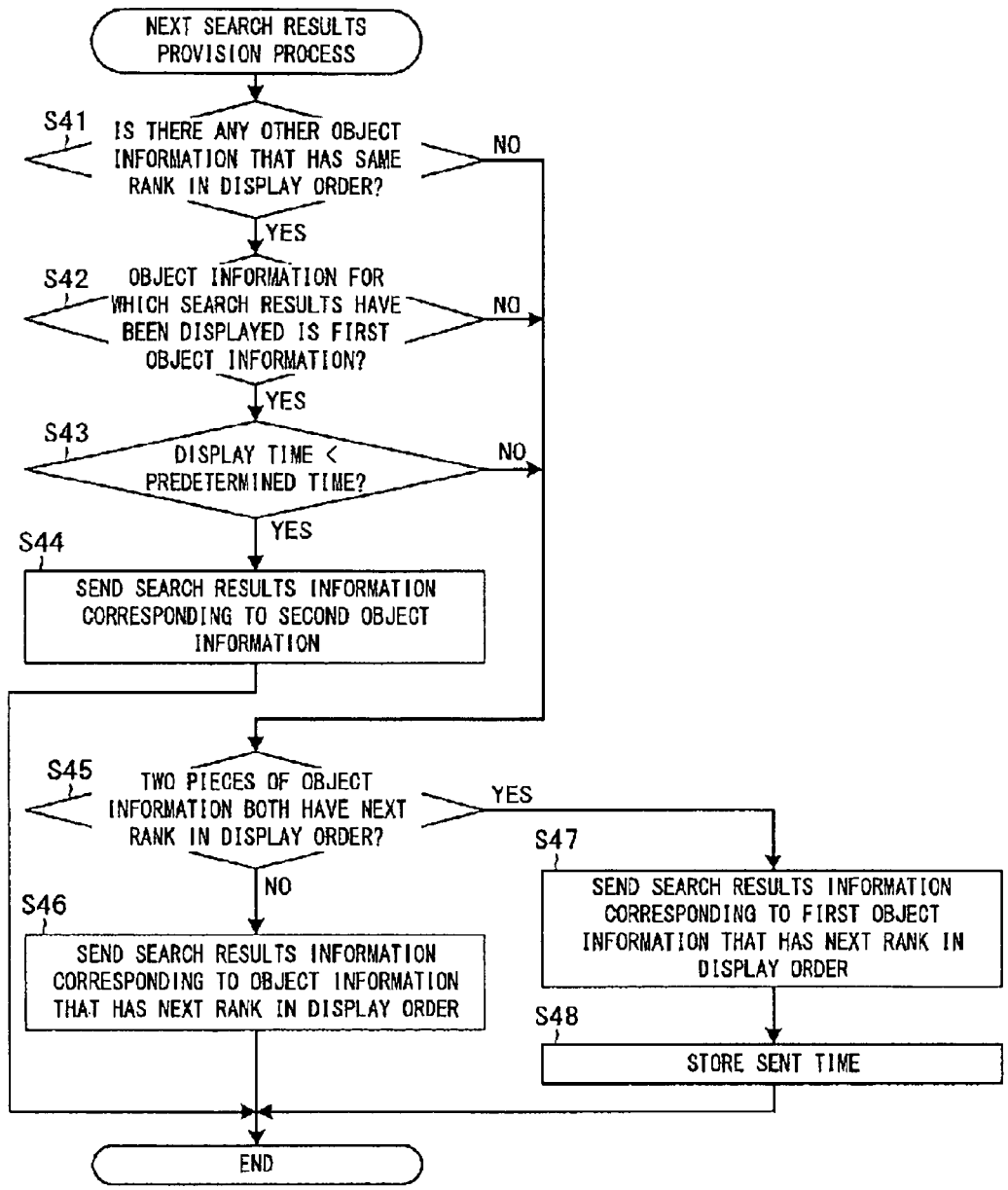
FIG. 11 is a flowchart showing an example process of a next search results provision process in the system controller 14 of the moving image distribution server 1 according to an embodiment.

FIG. 11 is a flowchart showing an example process of a next search results provision process in the system controller 14 of the moving image distribution server 1 according to this embodiment. A user selects the button 120 on the search results screen being displayed by the user terminal 4. Then, the user terminal 4 sends a next search results request to the moving image distribution server 1. The next search results request includes a user ID, a moving image ID, object information, and an object type. The user ID indicates the user who made the request. The moving image ID and the object information respectively indicates the moving image and the object corresponding to the search results screen being currently displayed. The object type indicates whether the object information is first object information or second object information. The next search results provision process is started when the moving image distribution server 1 receives the next search results request.

As shown in FIG. 11, the information provider 143 retrieves, from the storage unit 12, the display order list and the sent time corresponding to both the user ID and the moving image ID included in the next search results request. Subsequently, the information provider 143 determines whether there is any other object information that has the same rank in the display order as the object information for which the search results screen has been displayed, based on the display order list and the object information included in the next search results request (Step S41). Here, if the information provider 143 determines that there is no other such object identification (NO in Step S41), the process proceeds to Step S45. On the other hand, if the information provider 143 determines that there is other such object identification (YES in Step S41), the process proceeds to Step S42.

In Step S42, the information provider 143 determines whether the object information for which the search results screen has been displayed is first object information. Here, if the information provider 143 determines that the object information for which the search results screen has been displayed is not first object information (NO in Step S42), the process proceeds to Step S45. On the other hand, if the information provider 143 determines that the object information for which the search results screen has been displayed is first object information (YES in Step S42), the process proceeds to Step S43.

In Step S43, the information provider 143 calculates how long the search results screen has been displayed, by subtracting the sent time from the current time. Then, the information provider 143 determines whether the search results screen has been displayed for less than the predetermined time, which was preset. Here, if the information provider 143 determines that the search results screen has been displayed for the predetermined time or more (NO in Step S43), the process proceeds to Step S45. On the other hand, if the information provider 143 determines that the search results screen has been displayed for less than the predetermined time (YES in Step S43), the process proceeds to Step S44.

In Step S44, the information provider 143 sends the search results information corresponding to the second object information, among the two pieces of object information that have the current rank in the display order, to the user terminal 4 that has sent the next search results request. After Step S44, the information provider 143 terminates the next search results provision process.

In Step S45, the information provider 143 determines whether two pieces of object information both have the next rank in the display order (Step S45). Here, if the information provider 143 determines that only one piece of object information has the next rank in the display order (NO in Step S45), the process proceeds to Step S46. On the other hand, if the information provider 143 determines that two piece of object information both have the next rank in the display order (YES in Step S45), the process proceeds to Step S47.

In Step S46, the information provider 143 sends the search results information corresponding to the object information that is placed at the next rank in the display order to the user terminal 4 that has sent the next search results request. After Step S46, the information provider 143 terminates the next search results provision process.

In Step S47, the information provider 143 sends the search results information corresponding to the first object information, among the two pieces of object information that are placed at the next rank in the display order, to the user terminal 4 that has sent the next search results request. Subsequently, the information provider 143 obtains the current time as a sent time. Then, the information provider 143 stores the obtained sent time in association with both the user ID and the moving image ID included in the next search results request in the storage unit 12 (Step S48). After Step S48, the information provider 143 terminates the next search results provision process. The step of obtaining the search results information in Steps S44, S46, and S47 is the same as Step S27 shown in FIG. 8.

As described above, according to this embodiment, the system controller 14 receives specifying operation information including a moving image ID, a specifying time, and a specified position. When an object was specified by an object specifying operation, the received specifying operation information further includes object information. Subsequently, the system controller 14 retrieves, from the storage unit 12 that stores specifying operation information for each object specifying operation performed by a plurality of users, object information corresponding to all of the following: the moving image ID included in the received specifying operation information; a specifying time being within a retrospective period of time ending at the specifying time included in the received specifying operation information; and a specified position being within a predetermined distance from the specified position included in the received specifying operation information. Then, the system controller 14 causes a search results screen for an object indicated by at least one piece of information selected from among the object information included in the received specifying operation information and the retrieved object information to be presented to a user who performed the object specifying operation. Thus, information about an object can be provided even after the object has disappeared from a screen.

When the received specifying operation information includes object information and object information is retrieved from the storage unit 12, the system controller 14 causes a search results screen for an object indicated by either one of these pieces of object information to be displayed. If the display time of the displayed information is less than a predetermined time, the system controller 14 causes a search results screen for an object indicated by the other to be displayed. Thus, when search results screen for an object that a user intended to specify is displayed first, search results screen for an object that the user did not intend to specify can be prevented from being displayed. Consequently, unnecessary information can be prevented from being displayed.

The system controller 14 also sends a visibility-increasing information display instruction for an object indicated by the object information included in the received specifying operation information to the user terminal 4. This can make the object more likely to be noticed. Accordingly, the user can more easily specify the object.

In addition, the system controller 14 identifies an attribute of the object indicated by the object information included in the received specifying operation information. The system controller 14 also retrieves, from the storage unit 12, user ID(s) corresponding to object information indicating an object having the identified attribute. Then, the system controller 14 sends a visibility-increasing information display instruction to the user terminal(s) 4 used by the user(s) identified by the retrieved user ID(s). Consequently, only an object that is likely to interest a user can become more visible.

The system controller 14 also determines the retrospective period of time, based on method information included in the received specifying operation information. This can increase the probability that an object that the user intended to specify can be identified correctly.

2. Second Embodiment

Figure 12:
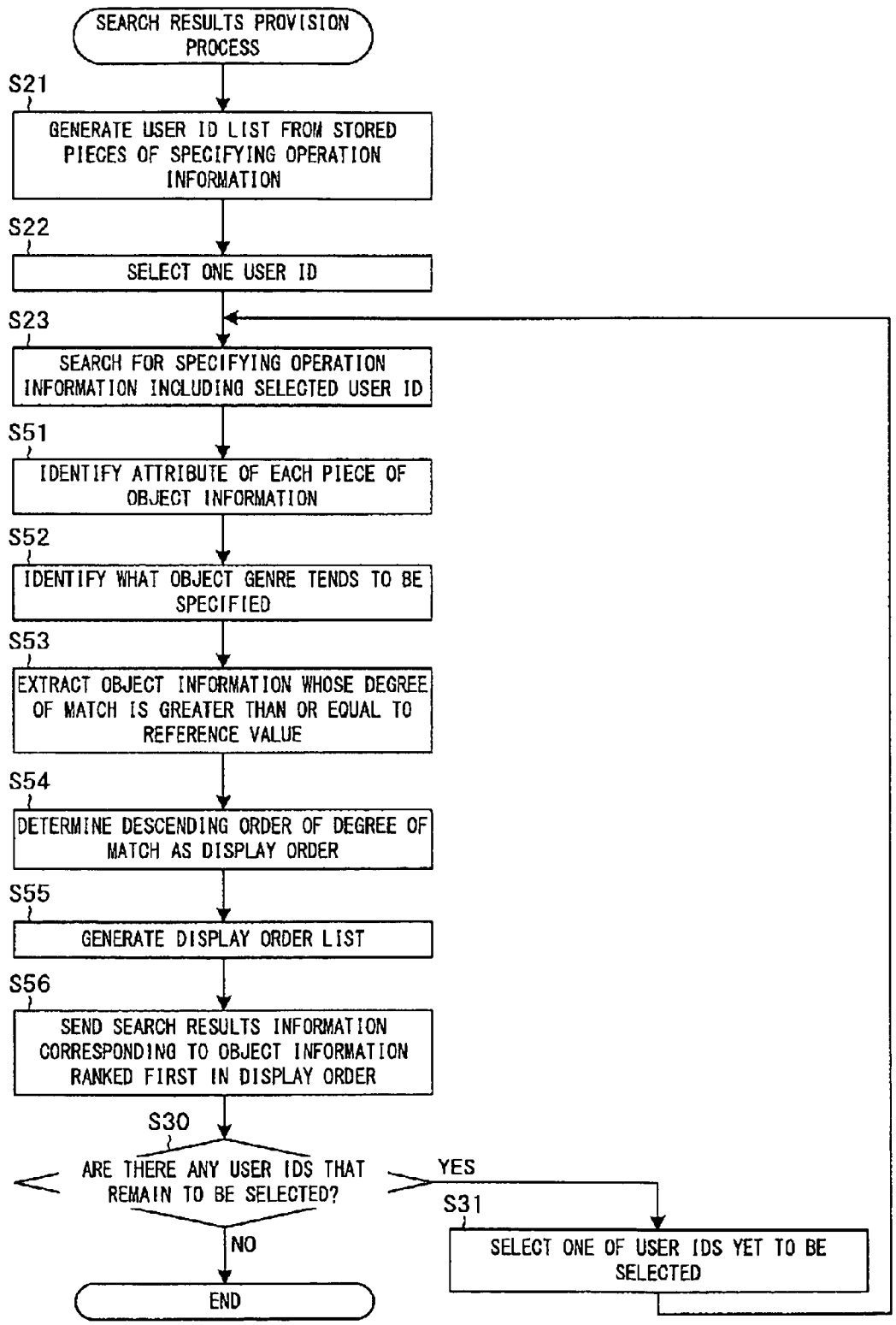
FIG. 12 is a flowchart showing an example process of the search results provision process in the system controller 14 of the moving image distribution server 1 according to an embodiment.

The following describes a second embodiment with reference to FIG. 12. In this embodiment, the moving image distribution server 1 controls presentation of search results screens, based on what object a user tends to specify during playback of a moving image. Specifically, the moving image distribution server 1 may cause a search results screen for an object whose degree of match with what object the user tends to specify is less than a predetermined value, among the specified or identified objects, not to be presented. Alternatively, the moving image distribution server 1 may cause search results screens for objects to be displayed in descending order of degree of match with what object the user tends to specify.

For example, what object the user tends to specify can be identified based on an attribute of the specified or identified objects. For example, the moving image distribution server 1 identifies a relatively dominant attribute. For example, the moving image distribution server 1 may identify an attribute whose proportion to total is greatest or is greater than or equal to a predetermined reference value. The user tends to specify an object having the identified attribute. The moving image distribution server 1 identifies the degree of match between the identified attribute and the attribute of the specified or identified object. For example, when using genre, the moving image distribution server 1 identifies which level of genre includes both an object genre that the user tends to specify and a genre of the specified or identified object. The deeper the level identified at this time is, the higher the degree of match is. The reference value in this case is a level. For example, when using an attribute expressed numerically, the moving image distribution server 1 calculates the difference between the attribute value of an object that the user tends to specify and the attribute value of the specified or identified object. The smaller the difference in the attribute value is, the higher the degree of match is. The reference value in this case is the magnitude of a difference.

When any other attributes than genre can also be identified, the moving image distribution server 1 may cause search results screens for objects having a more advantageous attribute for the user in terms of transaction to be preferentially displayed. For example, the moving image distribution server 1 may cause search results screens for objects to be displayed in ascending order of object price. Alternatively, for example, the moving image distribution server 1 may cause search results screens for objects to be displayed in descending order of object performance.

FIG. 12 is a flowchart showing an example process of the search results provision process in the system controller 14 of the moving image distribution server 1 according to this embodiment. In FIG. 12, the same components as those shown in FIG. 9 are denoted by the same reference signs. The following describes an example where genre is used as the attribute.

As shown in FIG. 12, Steps S21 to S23 are performed first. Then, the attribute identification unit 144 identifies the genres of the objects indicated by the pieces of first and second object information included in the retrieved pieces of specifying operation information (Step S51). Specifically, the attribute identification unit 144 retrieves the genre IDs in the same way as Step S3 of the specifying operation information reception process. Subsequently, the information provider 143 identifies what object genre the user tends to specify, based on the retrieved genre IDs (Step S52). For example, the information provider 143 calculates the proportion of each genre in the total number of the pieces of first and second object information included in the retrieved pieces of specifying operation information. Then, the information provider 143 identifies a genre whose proportion is greater than or equal to a predetermined value.

Next, the moving image distribution server 143 extracts objects belonging to genres whose degree of match with an object genre that the user tends to specify, among the specified or identified object (Step S53). Specifically, based on the genre information DB 2a, the information provider 143 identifies what genre includes both an object genre that the user tends to specify and a genre of each of the objects indicated by the pieces of object information included in the pieces of specifying operation information. If the information provider 143 can identify no genre including both, the degree of match is less than the reference value. If the information provider 143 can identify a genre including both can be identified, the information provider 143 retrieves the level of the identified genre from the genre information DB 2a. Then, the information provider 143 extracts objects whose retrieved level is greater than or equal to a level preset as the reference value.

Subsequently, the information provider 143 determines that a display order in which search results screens for the extracted objects, which correspond to the object information, are displayed is the descending order of degree of match with an object genre that the user tends to specify (Step S54). When any other attributes than genre can also be identified for each object, the information provider 143 may cause search results screens for objects having a more advantageous attribute for the user to be preferentially displayed. Alternatively, the information provider 143 may determine the display order based on both the degree of match in genre and the advantageous attribute for the user. For example, the information provider 143 may determine the entire display order based on the degree of match in genre. When a plurality of objects have the same degree of match in genre, the information provider 143 may then cause objects having a more advantageous attribute for the user, among these plurality of objects, to be preferentially displayed.

After that, the information provider 143 generates a list that associates pieces of object information and ranks in the display order with each other (Step S55). Then, the information provider 143 sends the search results information corresponding to the object information ranked first in the display order to the user terminal 4 used by the user identified by the selected user ID (Step S56). Subsequently, Steps S30 and S31 are performed.

The next search results provision process shown in FIG. 11 may be performed when the moving image distribution server 1 receives the next search results request. This process can present search results screens in the display order determined in the search results provision process. The first and second embodiments may be performed together.

As described above, according to this embodiment, the system controller 14 retrieves pieces of object information corresponding to the user ID included in the received specifying operation information from the storage unit 12. The system controller 14 also identifies what object tends to be specified, based on the retrieved pieces of object information. Then, the system controller 14 controls presentation of search results screens for objects, based on the identified tendency. Thus, a search results screen for an object that interests a user can be provided.

The system controller 14 also causes a search results screen for an object whose degree of match with the identified tendency is less than a predetermined value not to be presented. Thus, only a search results screen for an object that is likely to interest a user can be provided.

The system controller 14 also causes search results screens for objects to be presented in descending order of degree of match with the identified tendency. Thus, a search results screen for an object that is likely to interest a user can be preferentially provided.

In the above embodiments, information about an object is presented after distribution of a moving image. However, the information about the object may be presented when a user performs an object specifying operation during distribution of the moving image.

In the above embodiments, item information is presented as information about an object. However, information different from item information may be presented. For example, service information, a web page, an image, a sound, a document, news, or a blog may be presented. In the above embodiments, information about an object is searched for. However, for example, information pre-associated with object information may be presented.

In the above embodiments, an information processing apparatus according to the present invention is a server device that distributes moving images. However, the information processing apparatus according to the present invention need not have the function of distributing moving images, and instead a device different from the information processing apparatus according to the present invention may distribute the moving images.

In the above embodiments, the present invention is applied to distribution of moving images. However, the present invention may be applied to, for example, TV broadcasting.

REFERENCE SIGNS LIST 1 moving image distribution server
3 member information management server
4 user terminal
11 communication unit
12 storage unit
12a specifying operation information DB
12b search results DB
12c viewing history DB
13 input/output interface
14 system controller
14a CPU
14b ROM
14c RAM
15 system bus
141 specifying operation information receiver
142 object identification unit
143 information provider
144 attribute identification unit
145 visibility controller
2a genre information DB
2b item information DB
2c operation history DB 1a 3a member information DB
NW network
S information processing system

The invention claimed is:

1. An information processing apparatus comprising:
at least one memory configured to store computer program code;
at least one processor configured to access said memory and operate as instructed by said computer program code, said computer program code including:
operation information obtaining code configured to cause at least one of said at least one processor to obtain first moving image identification information identifying a moving image unavailable for an operation to move a playback position backward in time, a first time at which a specifying operation to specify a first position on a display was performed by a first user of a plurality of users to specify an object contained in the moving image displayed on the display, and the specified first position, and to further obtain first object information indicating the object when the object was specified by the specifying operation;
object information obtaining code configured to cause at least one of said at least one processor to obtain, from a storage that stores second moving image identification information identifying a moving image unavailable for an operation to move a playback position backward in time, a second time at which a specifying operation to specify a second position on a display was performed by a user to specify an object contained in the moving image displayed on the display, the specified second position, and second object information indicating the specified object in association with each other for each specifying operation performed by each of the plurality of users, the second object information corresponding to all of
i) a second moving image identification information identical with the obtained first moving image identification information,
ii) a second time being within a predetermined period of time ending at the obtained first time, and
iii) a second position being within a predetermined distance from the obtained first position; and
presentation control code configured to cause at least one of said at least one processor to cause information about an object indicated by at least one of the obtained first object information and the obtained second object information to be presented to the first user.

2. The information processing apparatus according to claim 1, wherein
the operation information obtaining code causes at least one of said at least one processor to further obtain first user identification information identifying the first user,
the storage stores the second moving image identification information, the second time, the second position, the second object information, and second user identification information identifying the user who performed the specifying operation in association with each other,
the information processing apparatus further comprises:
user object information obtaining code configured to cause at least one of said at least one processor to obtain, from the storage, the second object information corresponding to the second user identification information identical with the obtained first user identification information; and tendency identifying code configured to cause at least one of said at least one processor to identify what object the first user tends to specify, based on the second object information obtained, and
the presentation control code causes at least one of said at least one processor to control presentation of the information about the object, based on the identified tendency.

3. The information processing apparatus according to claim 2, wherein
the presentation control code causes at least one of said at least one processor to cause the information about the object whose degree of match with the identified tendency is less than a predetermined value not to be presented.

4. The information processing apparatus according to claim 2, wherein
every time the first user performs the specifying operation, the operation information obtaining code causes at least one of said at least one processor to obtain at least the first moving image identification information, the first time and the first position of the first moving image identification information, the first time, the first position and the first object information, and the object information obtaining code causes at least one of said at least one processor to obtain the second object information, and
the presentation control code causes at least one of said at least one processor to cause information about objects each identified by the obtained first or second object information to be presented in descending order of degree of match with the identified tendency.

5. The information processing apparatus according to claim 1, wherein,
when both of the first object information and the second object information are obtained, the presentation control code causes at least one of said at least one processor to cause information about an object identified by any one of the obtained first and second object information to be presented, and if the presented information has been presented for less than a predetermined time, the presentation control code causes at least one of said at least one processor to cause information about an object identified by another one of the obtained first and second object information to be presented.

6. The information processing apparatus according to claim 1, further comprising
sending code configured to cause at least one of said at least one processor to send, to a terminal device that is used by any second user, other than the first user, of the plurality of users and display the moving image identified by the second moving image identification information identical with the obtained first moving image identification information, information for increasing a visibility, on a display, of the object indicated by the obtained first object information.

7. The information processing apparatus according to claim 6, wherein
the storage stores the second moving image identification information, the second time, the second position, the second object information, and the second user identification information identifying the user who performed the specifying operation in association with each other,
the information processing apparatus further comprising:

attribute identifying code configured to cause at least one of said at least one processor to identify an attribute of the object indicated by the obtained first object information; and identification information obtaining code configured to cause at least one of said at least one processor to obtain, from the storage, the second user identification information corresponding to the second object information indicating an object having the identified attribute, wherein the sending code causes at least one of said at least one processor to send the information for increasing the visibility to a terminal device used by a second user identified by the obtained second user identification information.

8. The information processing apparatus according to claim 1, wherein the operation information obtaining code causes at least one of said at least one processor to further obtain method information indicating how the specifying operation was performed, and the object information obtaining code causes at least one of said at least one processor to determine a length of the period of time, based on the obtained method information.

9. An information processing method performed by a computer, the method comprising:

obtaining first moving image identification information identifying a moving image unavailable for an operation to move a playback position backward in time, a first time at which a specifying operation to specify a first position on a display was performed by a first user of a plurality of users to specify an object contained in the moving image displayed on the display, and the specified first position, and for further obtaining first object information indicating the object when the object was specified by the specifying operation;

obtaining, from a storage that stores second moving image identification information identifying a moving image unavailable for an operation to move a playback position backward in time, a second time at which a specifying operation to specify a second position on a display was performed by a user to specify an object contained in the moving image displayed on the display, the specified second position, and second object information indicating the specified object in association with each other for each specifying operation performed by each of the plurality of users, the second object information corresponding to all of i) a second moving image identification information identical with the obtained first moving image identification information, ii) a second time being within a predetermined period of time ending at the obtained first time, and iii) a second position being within a predetermined distance from the obtained first position; and causing information about an object indicated by at least one of the obtained first object information and the obtained second object information to be presented to the first user.

* * * * *